United States Patent Office 3,157,698
Patented Nov. 17, 1964

3,157,698
DURENE BISGLYOXAL DERIVATIVES
Elvin L. Anderson, Moorestown, N.J., assignor to Smith
Kline & French Laboratories, Philadelphia, Pa., a corporation of Pennsylvania
No Drawing. Filed Feb. 16, 1962, Ser. No. 173,798
5 Claims. (Cl. 260—518)

This invention relates to novel durene bisglyoxal derivatives. More specifically, this invention relates to bisglyoxalyl durene and its corresponding hydrates, alcoholates, alkali metal bisulfite salts and carbonyl functional derivatives.

The novel durene bisglyoxal derivatives of this invention are useful as antiviral agents, particularly against distemper virus, influenza virus ($PR_8$), hepatitis virus ($MHV_3$), neurotropic virus (CLM), herpes simplex, adenovirus, Newcastle disease virus, Coxsackie virus, Echo virus and hemadsorption virus; especially influenza ($PR_8$), hepatitic ($MHV_3$) and herpetic (simplex) viruses.

The durene bisglyoxal derivatives are represented by the following fundamental formula:

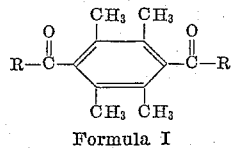

Formula I

Where R represents

—CHO $$-\underset{\underset{SO_3M}{|}}{CH}-OH$$

where M is a nontoxic alkali metal, preferably sodium or potassium, $$-\underset{\underset{OR_1}{|}}{CH}-OH$$

where $R_1$ is hydrogen or a hydrocarbon radical containing from 1 to 12 carbon atoms inclusive, or

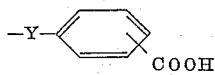

where Y is $$-\underset{\underset{OR_1}{|}}{CH}-NH-\ \text{or}\ -CH=N-$$

and $R_1$ is as defined above.

Advantageous compounds of this invention are represented by Formula I above when R represents

—CHO $$-\underset{\underset{SO_3Na}{|}}{CH}-OH$$

$$-\underset{\underset{OR_1}{|}}{CH}-OH$$

where $R_1$ is hydrogen, a lower saturated or unsaturated aliphatic hydrocarbon radical of from 1 to 8 carbon atoms, inclusive, or a benzyl radical, or

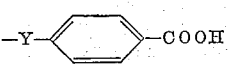

where Y is $$-\underset{\underset{OR_1}{|}}{CH}-NH-\ \text{or}\ -CH=N-$$

and $R_1$ is as defined immediately above.

Preferred compounds of this invention are represented by Formula I above where R represents $$-\underset{\underset{OH}{|}}{CH}-OH$$

or

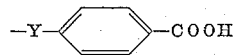

where Y is $$-\underset{\underset{OR_1}{|}}{CH}-NH-\ \text{or}\ -CH=N-$$

and $R_1$ is lower alkyl of from 1 to 4 carbon atoms, particularly methyl or ethyl.

Particularly advantageous is durene 1,4-bisglyoxal hydrate.

The parent durene bisglyoxal of this invention is prepared from the corresponding 1,4-diacetyldurene by oxidation with an agent such as selenium dioxide. The 1,4-diacetyldurene is obtained by a Friedel-Crafts acylation with acetyl chloride under standard conditions (aluminum chloride in carbon disulfide).

The 1,4-diacetyldurene is reacted with selenium dioxide in a suitable organic solvent such as dioxane, tetrahydrofuran, acetone, ethanol, benzene and the like. Theoretically two moles of selenium dioxide is required for one mole of diacetyldurene. However, an excess such as from about 3 to about 7 moles of oxidizing agent may likewise be employed for each mole of starting material. The reaction is carried out at a temperature in the range of from about 30° C. up to the boiling point of the solvent used and for from about 30 minutes to 12 hours. Preferably the reaction is carried out at from about 75–125° C. for about 2 to 8 hours. Filtering the reaction mixture and adding water to the filtrate yields the durene bisglyoxal hydrate. Oxidation under anhydrous conditions such as in anhydrous dioxane, yields the anhydrous glyoxal.

Alternatively, the durene bisglyoxal is prepared from corresponding bis-haloacetyl or dihaloacetyl durenes which are obtained by Friedel-Crafts acylation with haloacetyl or dihaloacetyl halide. Preferably the halogen is chlorine or bromine. Also, the bis-dihaloacetyl derivatives are prepared by direct halogenation of the diacetyl-durene preferably with chlorine or bromine, in an unreactive organic solvent such as chloroform, carbon tetrachloride, methylene chloride and the like, or preferably glacial acetic acid. The bishaloacetyl durene is converted to the bisglyoxal via the Sommelet reaction, that is refluxing the halide with hexamethylenetetramine followed by decomposition of the quaternary ammonium salt with water. The bisdihaloacetyl durene is converted to the glyoxal by reaction with an alkali metal alcoholate such as sodium or potassium methylate or ethylate in a suitable solvent, usually anhydrous lower alcohols, to form the corresponding glyoxalyl acetal derivatives. The reaction is preferably run at about 40–60° C. for from 1–3 hours with the reaction mixture maintained at pH 7. The acetal compound is then hydrolyzed with dilute acid such as 3% sulfuric or hydrochloric acid in a suitable solvent such as acetic acid to form the glyoxalyl derivative.

The hydrate or alcoholate derivatives of this invention are prepared from the anhydrous glyoxal by reaction with water or an alcohol, usually at room or slightly elevated temperature such as up to about 100° C. for from about 10 minutes to about 10 hours.

The alcoholates are advantageously prepared by reacting the anhydrous glyoxal or hydrate thereof with an alcohol, usually in an excess of the alcohol with gentle heating between from about 50° C. to about 80° C. Alternatively, the glyoxal hydrate can be heated in an excess of an anhydrous alcohol with azeotropic removal of the water formed employing an organic solvent such as benzene, xylene or toluene, to give the desired alcoholate.

The durene bisglyoxal alkali metal bisulfite salts of this invention are prepared by reacting the bisglyoxal, anhydrous or hydrated with preferably sodium or potassium bisulfite, approximately two moles per mole of bisglyoxal.

The aminocarbinol derivatives of Formula I where Y is

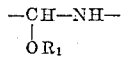

are prepared by condensing either a durene bisglyoxal alcoholate or hydrate with an aminobenzoic acid. Advantageously, the bisglyoxal derivative and the amino reactant (approximately 2 moles per 1 mole of bisglyoxalyl durene) in an inert organic solvent are reacted at from about 25° C. to about the boiling point of the solvent employed for from about 15 minutes to about 24 hours. Preferably the reaction time is from about 30 minutes to 8 hours at temperatures from about 40–100° C. Using the glyoxalyl alcoholate as the starting material, it is advantageous to use the corresponding anhydrous alcohol as the reaction solvent. It is often advantageous to prepare the glyoxalyl alcoholate in situ from the corresponding hydrate by a brief reflux in the desired alcohol in the presence of sulfuric acid. The aminocarbinol condensation derivative is usually isolated by filtration or evaporation of the solvent.

The methyleneimino derivatives of Formula I where Y is –CH=N– are prepared by decomposition of the corresponding aminocarbinol derivatives prepared as described above. The decomposition is accomplished by heating the aminocarbinol to a temperature of from about 70° C. to about 140° C., preferably under reduced pressure of from about 0.01–15 mm. of mercury and in the absence of solvent in an anhydrous atmosphere. Although the time necessary for decomposition is variable, at 100–120° C. and a pressure of 0.1–15 mm. of mercury the reaction is complete in about 1–10 hours. Alternatively the decomposition is accomplished at atmospheric pressure by infrared heating at 100–150° C. or by refluxing in for example toluene or xylene for from 2–8 hours.

The methyleneimino derivatives are alternatively prepared by reacting the anhydrous durene bisglyoxal with an aminobenzoic acid directly. The reaction is carried out in the absence of solvents or in an inert, anhydrous organic solvent such as toluene or xylene. In the absence of a solvent, the reaction is carried out at from about 90–125° C. for from about 6–10 hours. When a solvent is employed the reaction is conveniently run at the reflux temperature of the solvent for from about 6–10 hours.

The following specific examples are not limiting but illustrate the novel compounds of this invention and make fully apparent the practice of this invention to one skilled in the art.

*Example 1*

1,4-diacetyldurene (95.2 g.) is added at 60° C. to a stirred mixture of 700 ml. of dioxane, 28 ml. of water and 99.2 g. of selenium dioxide. The reaction mixture is refluxed for six hours. After cooling to about 80° C. the reaction mixture is filtered, diluted with water, heated to boiling and refiltered. The product is recrystallized from acetic acid and water to give durene 1,4-bisglyoxal hydrate, M.P. 212–214° C. (dec.).

Similarly, running the above reaction in anhydrous dioxane under anhydrous conditions, filtering the reaction mixture while hot, followed by partial evaporation and cooling yields the anhydrous durene 1,4-bisglyoxal.

*Example 2*

A solution of 12.5 g. of durene 1,4-bisglyoxal, 13.7 g. of p-aminobenzoic acid and 500 ml. of ethanol is heated under reflux for three hours and allowed to stand overnight. The reaction mixture is chilled in an ice bath and filtered to yield 2,3,5,6-tetramethylterephthaloyl bis(p-ethoxymethylaminobenzoic acid), M.P. 331–333° C. (dec.).

*Example 3*

A suspension of 23.6 g. of 2,3,5,6-tetramethylterephthaloyl bis(p-ethoxymethylaminobenzoic acid) in 250 ml. of toluene is heated under reflux with stirring. The solvent is slowly distilled while more toluene is added (ca. 125 ml.) over two and one-half hours. The reaction mixture is then cooled and filtered to give 2,3,5,6-tetramethylterephthaloyl bis(p-methyleneiminobenzoic acid), M.P. above 315° C.

*Example 4*

A mixture of 5.0 g. of durene 1,4-bisglyoxal hydrate in 150 ml. of absolute ethyl alcohol is heated at reflux for several hours. The clear solution is evaporated slightly and then cooled to give durene 1,4-bisglyoxal ethylate.

Similarly, by following the above procedure 5.0 g. of durene 1,4-bisglyoxal hydrate is reacted with an excess of other alcohols to give the corresponding methylate, n-propylate, isopropylate, n-butylate, allylate, propargylate and the like of durene 1,4-bisglyoxal.

*Example 5*

To a suspension of 28.2 g. of durene 1,4-bisglyoxal hydrate in 300 ml. of dioxane is added 21.0 g. of sodium bisulfite dissolved in 150 ml. of water. The mixture is heated on the steam bath for 20 minutes, cooled to 10° C. and then filtered to give the durene 1,4-bisglyoxal sodium bisulfite salt.

*Example 6*

A mixture of 2.5 g. of durene 1,4-bisglyoxal hydrate and 100 ml. of anhydrous n-octyl alcohol in 250 ml. of anhydrous benzene is heated at reflux for 12 hours over a water trap (Org. Syn. 3, 382) having an inner funnel containing a mixture of phosphorus pentoxide and a filter aid. The mother liquor is then concentrated in vacuo to give durene 1,4-bisglyoxal n-octylate.

Similarly, by following the above procedure 2.5 g. of durene 1,4-bisglyoxal hydrate is reacted with an excess of other alcohols to give the corresponding n-hexylate, cyclohexylate, citronellylate, phenylate and benzylate of durene 1,4-bisglyoxal.

*Example 7*

To 14.1 g. of durene 1,4-bisglyoxal hydrate in 150 ml. of methanol is added one drop of concentrated sulfuric acid. The mixture is refluxed for 15 minutes to form the durene 1,4-bisglyoxal methylate and then 13.4 g. of p-aminobenzoic acid is added. The refluxing is continued for 30 minutes and the precipitated solid is filtered hot to give 2,3,5,6-tetramethylterephthaloyl bis(p-methoxymethylaminobenzoic acid).

Similarly, reacting any of the alcoholates of Examples 4 and 6 according to the above procedure with two molar equivalents of p-aminobenzoic acid gives the corresponding condensation derivatives.

*Example 8*

A mixture of 12.3 g. of anhydrous durene 1,4-bisglyoxal, 13.8 g. of o-aminobenzoic acid and 300 ml. of anhydrous toluene is refluxed for 10 hours. The precipitate obtained is 2,3,5,6-tetramethylterephthaloyl bis(o-methyleneiminobenzoic acid).

*Example 9*

A mixture of 14.1 g. of durene 1,4-bisglyoxal hydrate and 13.8 g. of p-aminobenzoic acid in 200 ml. of benzene is warmed on the steam bath for two hours to give 2,3,5,6-tetramethylterephthaloyl bis(p - methyleneiminobenzoic acid). The latter is recrystallized from aqueous alcohol to yield 2,3,5,6-tetramethylterephthaloyl bis(p-hydroxymethylaminobenzoic acid).

What is claimed is:

1. A chemical compound selected from the group consisting of compounds of the formula:

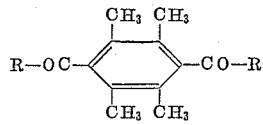

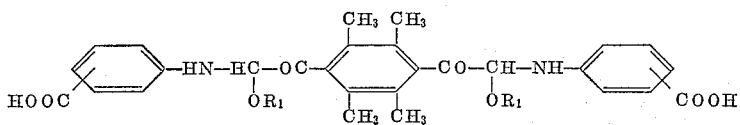

and

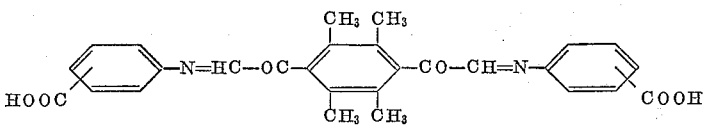

in which

R is a member selected from the group consisting of —CHO,

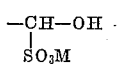

in which M is a nontoxic alkali metal and

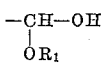

and $R_1$ is a member selected from the group consisting of hydrogen, alkyl of 1 to 12 carbon atoms inclusive and benzyl.

2. A chemical compound of the formula:

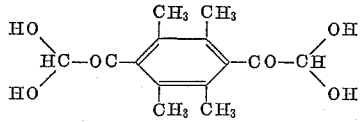

3. A chemical compound of the formula:

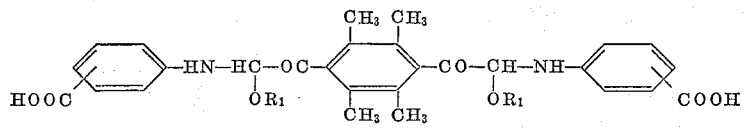

in which $R_1$ is alkyl of 1 to 8 carbon atoms inclusive.

4. A chemical compound of the formula:

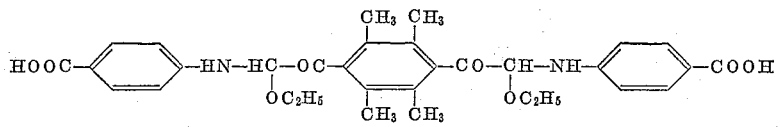

5. A chemical compound of the formula:

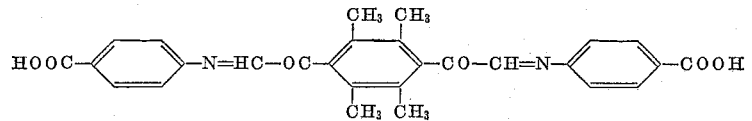

References Cited in the file of this patent
Ruggli et al.: Chem. Abstracts, 33, 6849 (1939).